US00RE44426E

(19) United States
(12) Reissued Patent
Kang

(10) Patent Number: US RE44,426 E
(45) Date of Reissued Patent: *Aug. 13, 2013

(54) CONTINUOUS CASTING OF FOAMED BULK AMORPHOUS ALLOYS

(75) Inventor: James Kang, Laguna Niguel, CA (US)

(73) Assignee: Crucible Intellectual Property, LLC, Rancho Santa Margarita, CA (US)

( * ) Notice: This patent is subject to a terminal disclaimer.

(21) Appl. No.: 13/233,492

(22) Filed: Sep. 15, 2011

Related U.S. Patent Documents

Reissue of:
(64) Patent No.: 7,588,071
Issued: Sep. 15, 2009
Appl. No.: 10/552,496
PCT Filed: Apr. 14, 2004
PCT No.: PCT/US2004/011909
§ 371 (c)(1),
(2), (4) Date: Apr. 23, 2007
PCT Pub. No.: WO2004/091828
PCT Pub. Date: Oct. 28, 2004

(51) Int. Cl.
*B22D 11/06* (2006.01)
*B22D 27/00* (2006.01)

(52) U.S. Cl.
USPC ..... 164/463; 164/79; 164/423

(58) Field of Classification Search
USPC ..... 164/463, 423, 479–482, 79
See application file for complete search history.

(56) References Cited

U.S. PATENT DOCUMENTS 2,106,744 A * 2/1938 Nordberg et al. ..... 502/439
2,190,611 A * 2/1940 Sembdner ..... 29/33 R
2,215,039 A * 9/1940 Nordberg et al. ..... 65/32.5
2,221,709 A * 11/1940 Hood et al. ..... 501/54
2,286,275 A * 6/1942 Hood et al. ..... 65/32.5
2,755,237 A * 7/1956 Turner ..... 428/606
3,434,827 A * 3/1969 Lemkey ..... 428/613
3,594,292 A * 7/1971 Russell et al. ..... 428/596
3,615,900 A * 10/1971 Lee ..... 148/671
3,773,098 A * 11/1973 Rock ..... 164/79
3,775,176 A * 11/1973 Cross et al. ..... 427/353
3,989,517 A * 11/1976 Tanner et al. ..... 148/403
4,050,931 A * 9/1977 Tanner et al. ..... 148/403
4,064,757 A * 12/1977 Hasegawa ..... 374/185
4,067,732 A * 1/1978 Ray ..... 148/403
4,099,961 A * 7/1978 Patten ..... 75/415
4,113,478 A * 9/1978 Tanner et al. ..... 148/403
4,115,682 A * 9/1978 Kavesh et al. ..... 219/118
4,116,682 A * 9/1978 Polk et al. ..... 148/403
4,116,687 A * 9/1978 Hasegawa ..... 148/403
4,126,449 A * 11/1978 Tanner et al. ..... 148/403

(Continued)

FOREIGN PATENT DOCUMENTS

GB 2075551 A * 11/1981
GB 2236325 A 3/1991

(Continued)

OTHER PUBLICATIONS

American Society for Metals, "Forging and Casting", Metals Handbook, Jan. 1970, vol. 5, 8th Edition, 16 pgs.*

(Continued)

*Primary Examiner* — Keith Walker
*Assistant Examiner* — Kevin E Yoon
(74) *Attorney, Agent, or Firm* — Pillsbury Winthrop Shaw Pittman LLP

(57) ABSTRACT

Methods and apparatuses for the continuous casting of solid foam structures with varying bubble density from bulk solidifying amorphous alloys are provided. Continuously cast solid foam structures having bubble densities in the range of from 50 percent up to 95% by volume are also provided.

25 Claims, 7 Drawing Sheets

(56) References Cited

U.S. PATENT DOCUMENTS

| | | | | | |
|---|---|---|---|---|---|
| 4,135,924 | A * | 1/1979 | Tanner et al. | 148/403 |
| 4,148,669 | A * | 4/1979 | Tanner et al. | 148/538 |
| 4,157,327 | A * | 6/1979 | Martin et al. | 523/307 |
| 4,289,009 | A * | 9/1981 | Festag et al. | 72/60 |
| 4,472,955 | A * | 9/1984 | Nakamura et al. | 72/57 |
| 4,478,918 | A * | 10/1984 | Ueno et al. | 429/435 |
| 4,621,031 | A * | 11/1986 | Scruggs | 428/627 |
| 4,623,387 | A * | 11/1986 | Masumoto et al. | 420/41 |
| 4,648,437 | A * | 3/1987 | Pryor et al. | 164/463 |
| 4,648,609 | A * | 3/1987 | Deike | 279/19.1 |
| 4,710,235 | A * | 12/1987 | Scruggs | 419/7 |
| 4,721,154 | A * | 1/1988 | Christ et al. | 164/452 |
| 4,743,513 | A * | 5/1988 | Scruggs | 428/668 |
| 4,768,458 | A * | 9/1988 | Arakawa et al. | 164/463 |
| 4,791,979 | A * | 12/1988 | Liebermann | 164/463 |
| 4,854,370 | A * | 8/1989 | Nakamura | 164/259 |
| 4,976,417 | A * | 12/1990 | Smith | 267/25 |
| 4,978,590 | A * | 12/1990 | Granata et al. | 429/510 |
| 4,987,033 | A * | 1/1991 | Abkowitz et al. | 428/469 |
| 4,990,198 | A * | 2/1991 | Masumoto et al. | 148/403 |
| 5,032,196 | A * | 7/1991 | Masumoto et al. | 148/403 |
| 5,053,084 | A * | 10/1991 | Masumoto et al. | 148/561 |
| 5,053,085 | A * | 10/1991 | Masumoto et al. | 148/403 |
| 5,074,935 | A * | 12/1991 | Masumoto et al. | 148/403 |
| 5,117,894 | A * | 6/1992 | Katahira | 164/113 |
| 5,131,279 | A * | 7/1992 | Lang et al. | 73/861.27 |
| 5,169,282 | A * | 12/1992 | Ueda et al. | 414/800 |
| 5,213,148 | A * | 5/1993 | Masumoto et al. | 164/122 |
| 5,225,004 | A * | 7/1993 | O'Handley et al. | 148/101 |
| 5,250,124 | A * | 10/1993 | Yamaguchi et al. | 148/403 |
| 5,279,349 | A * | 1/1994 | Horimura | 164/120 |
| 5,281,251 | A * | 1/1994 | Kenny et al. | 75/415 |
| 5,288,344 | A * | 2/1994 | Peker et al. | 148/403 |
| 5,296,059 | A * | 3/1994 | Masumoto et al. | 148/695 |
| 5,302,471 | A * | 4/1994 | Ito et al. | 429/442 |
| 5,306,463 | A * | 4/1994 | Horimura | 419/44 |
| 5,312,495 | A * | 5/1994 | Masumoto et al. | 148/550 |
| 5,324,368 | A * | 6/1994 | Masumoto et al. | 148/561 |
| 5,325,368 | A * | 6/1994 | James et al. | 714/727 |
| 5,368,659 | A * | 11/1994 | Peker et al. | 148/403 |
| 5,380,375 | A * | 1/1995 | Hashimoto et al. | 148/403 |
| 5,384,203 | A * | 1/1995 | Apfel | 428/613 |
| 5,390,724 | A * | 2/1995 | Yamauchi et al. | 164/147.1 |
| 5,449,425 | A * | 9/1995 | Renard et al. | 156/78 |
| 5,482,580 | A * | 1/1996 | Scruggs et al. | 148/528 |
| 5,567,251 | A * | 10/1996 | Peker et al. | 148/522 |
| 5,589,012 | A * | 12/1996 | Hobby et al. | 148/561 |
| 5,618,359 | A * | 4/1997 | Lin et al. | 148/561 |
| 5,634,989 | A * | 6/1997 | Hashimoto et al. | 148/403 |
| 5,647,921 | A * | 7/1997 | Odagawa et al. | 148/561 |
| 5,711,363 | A * | 1/1998 | Scruggs et al. | 164/113 |
| 5,735,975 | A * | 4/1998 | Lin et al. | 148/403 |
| 5,797,443 | A * | 8/1998 | Lin et al. | 164/4.1 |
| 5,865,237 | A * | 2/1999 | Schorghuber et al. | 164/79 |
| 5,886,254 | A * | 3/1999 | Chi | 73/146.8 |
| 5,950,704 | A * | 9/1999 | Johnson et al. | 164/47 |
| 6,021,840 | A * | 2/2000 | Colvin | 164/113 |
| 6,027,586 | A * | 2/2000 | Masumoto et al. | 148/561 |
| 6,044,893 | A * | 4/2000 | Taniguchi et al. | 164/70.1 |
| 6,200,685 | B1 * | 3/2001 | Davidson | 428/472.1 |
| 6,203,936 | B1 * | 3/2001 | Cisar et al. | 429/518 |
| 6,258,183 | B1 * | 7/2001 | Onuki et al. | 148/403 |
| 6,306,228 | B1 * | 10/2001 | Inoue et al. | 148/538 |
| 6,325,868 | B1 * | 12/2001 | Kim et al. | 148/403 |
| 6,371,195 | B1 * | 4/2002 | Onuki et al. | 164/113 |
| 6,376,091 | B1 * | 4/2002 | Croopnick | 428/472 |
| 6,408,734 | B1 * | 6/2002 | Cohen | 89/36.02 |
| 6,408,928 | B1 * | 6/2002 | Heinrich et al. | 164/46 |
| 6,446,558 | B1 * | 9/2002 | Peker et al. | 102/306 |
| 6,491,592 | B2 * | 12/2002 | Cackett et al. | 473/342 |
| 6,771,490 | B2 * | 8/2004 | Peker et al. | 361/679.34 |
| 6,843,496 | B2 * | 1/2005 | Peker et al. | 280/610 |
| 6,887,586 | B2 * | 5/2005 | Peker et al. | 428/600 |
| 7,575,040 | B2 * | 8/2009 | Johnson | 164/463 |
| 2001/0052406 | A1 * | 12/2001 | Kubota et al. | 164/138 |
| 2002/0036034 | A1 * | 3/2002 | Xing et al. | 148/561 |
| 2002/0050310 | A1 * | 5/2002 | Kundig et al. | 148/561 |
| 2002/0187379 | A1 * | 12/2002 | Yasuo et al. | 429/34 |
| 2003/0024616 | A1 * | 2/2003 | Kim et al. | 148/561 |
| 2003/0051850 | A1 * | 3/2003 | Asholt et al. | 164/79 |
| 2003/0222122 | A1 * | 12/2003 | Johnson et al. | 228/101 |

FOREIGN PATENT DOCUMENTS

| | | | |
|---|---|---|---|
| GB | 2236325 | A * | 4/1991 |
| JP | 57109242 | | 7/1982 |
| JP | 57109242 | A * | 7/1982 |
| JP | 61238423 | A * | 10/1986 |
| JP | 06-264200 | | 9/1994 |
| JP | 06264200 | A * | 9/1994 |
| JP | 2000-256811 | | 9/2000 |
| JP | 2000256811 | A * | 9/2000 |
| JP | 2000277127 | | 10/2000 |
| JP | 2000277127 | A * | 10/2000 |
| JP | 2001303218 | | 10/2001 |
| JP | 2001303218 | A * | 10/2001 |

OTHER PUBLICATIONS

Inoue et al., "Mg-Cu-Y Bulk Amorphous Alloys with High Tensile Strength Produced by a High-Pressure Die Casting Method", Materials Transactions, JIM, vol. 33, No. 10, pp. 937-945.*

Inoue et al., "Bulky La-A1-TM (TM=Transition Metal) Amorphous Alloys with High Tensile Strength Produced by a High-Pressure Die Casting Method", Materials Transactions, JIM, vol. 34, No. 4, 1993, pp. 351-358.*

Kato et al., Production of Bulk Amorphous Mg85Y10Cu5 Alloy by Extrusion of Atomized Amorphous Powder, Materials Transactions, JIM, vol. 35, No. 2, 1994, pp. 125-129.*

Kawamura et al., Full Strength Compacts by Extrusion of Glassy Metal Powder at the Supercooled Liquid State, American Institute of Physics, May 30, 1995, vol. 67, No. 14, pp. 2008-2010.*

Polk et al., "The Effect of Oxygen Additions on the Properties of Amorphous Transition Metal Alloys", pp. 220-230.*

"Interbike Buyer Official Show Guide", advertisement, 1995, 1 page.*

Primedia, Inc., "Interbike Official Show Guide Content", 1 page.*

Amorphous Metal Research, "Interbike Exhibitors", 1995 Interbike Buyer, p. 171, 1 pg.*

UES, Inc. Software Products Center, "ProCAST . . . not just for castings!", Sep. 30, 1996, 1 pg.*

Warren M. Rohsenow, "Heat Transfer", Handbook of Engineering, 1936, Section 12, pp. 1113-1119.

* cited by examiner

CONTINUOUS CASTING OF FOAMED BULK AMORPHOUS ALLOYS

Matter enclosed in heavy brackets [ ] appears in the original patent but forms no part of this reissue specification; matter printed in italics indicates the additions made by reissue.

FIELD OF THE INVENTION

The present invention is directed to methods of continuous casting amorphous metallic foams, and to amorphous metallic foams made from bulk-solidifying amorphous alloys.

BACKGROUND OF THE INVENTION

Metallic foam structures (metallic solid foam or metallic cellular solids) are known to have interesting combinations of physical properties. Metallic foams offer high stiffness in combination with very low specific weight, high gas permeability, and a high energy absorption capability. As a result, these metallic foam materials are emerging as a new engineering material. Generally, foam structures can be classified as either open or closed porous. Open foams are mainly used as functional materials, such as for gas permeability membranes, while closed foams find application as structural materials, such as energy absorbers. However, the broad application of metallic foams has been hindered by the inability of manufacturers to produce uniform and consistent foam structures at low cost. Specifically, current manufacturing methods for producing metallic foams result in an undesirably wide distribution of cell and/or pore sizes which cannot be satisfactorily controlled. These manufacturing limits in turn degrade the functional and structural properties of the metallic foam materials.

The production of metallic foamed structures is generally carried out in the liquid state above the melting temperature of the material, though some solid-state methods have also been used. The foaming of ordinary metals is challenging because a foam is an inherently unstable structure. The reason for the imperfect properties of conventional metallic foams comes from the manufacturing process itself. For example, although a pure metal or metal alloy can be manufactured to have a large volume fraction (>50%) of gas bubbles, a desired bubble distribution cannot be readily sustained for practical times while these alloys are in their molten state. This limitation also results in difficulties in attempts to produce continuously cast parts with different thicknesses and dimensions.

Specifically, the time scales for the flotation of bubbles in a foam scales with the viscosity of the material. Most conventional alloys have a very low viscosity in the molten state. Accordingly, the mechanical properties of these foams are degraded with the degree of imperfection caused by the flotation and bursting of bubbles during manufacture. In addition, the low viscosity of commonly used liquid metals results in a short time scale for processing, which makes the processing of metallic foam a delicate process.

In order to remedy these shortcomings, several techniques have been attempted. For example, to reduce the sedimentation flotation process, Ca particles may be added to the liquid alloy. However, the addition of Ca itself degrades the metallic nature of the base metal as well as the resultant metallic foam. Alternatively, foaming experiments have been performed under reduced gravity, such as in space, to reduce the driving force for flotation, however, the cost for manufacturing metallic foams in space is prohibitive.

Accordingly, a need exists for improved methods of manufacturing amorphous metallic foams.

SUMMARY OF THE INVENTION

The present invention is directed to method of continuous casting of amorphous metallic foams in sheet or other blanks forms.

In one embodiment of the invention, the foam sheet is formed using conventional single roll, double roll, or other chill-body forms.

In another embodiment of the invention, the amorphous alloy foam sheets have sheet thicknesses of from 0.1 mm to 10 mm.

In one embodiment of the invention, a bubble density less than 10% by volume in the foam precursor is increased in the subsequent steps to produce a solid foam material with more than 80% by volume bubble density.

In another embodiment of the invention, the bubble density increases by a factor of 5 or more from the initial foam precursor into the final continuously cast solid foam material.

In still another embodiment of the invention, the majority of the bubble expansion is achieved at temperatures above Tnose and temperatures below about Tm.

In yet another embodiment of the invention, the bubble density is increased by a factor of 5 or more from the initial foam precursor at temperatures above Tnose and temperatures below about Tm.

In still yet another embodiment of the invention, a bubble density less than 10% by volume in the foam precursor is increased to more than 80% by volume bubble density at temperatures above Tnose and temperatures below about Tm.

In one embodiment of the invention, the melt temperature is stabilized in a viscosity regime of 0.1 to 10,000 poise.

In another embodiment of the invention, the melt temperature is stabilized in a viscosity regime of 1 to 1,000 poise.

In still another embodiment of the invention, the melt temperature is stabilized in a viscosity regime of 10 to 10,000 poise.

In one embodiment of the invention, the extraction of continuous foam sheet is preferably done at speeds of 0.1 to 50 cm/sec In another embodiment of the invention, the extraction of continuous foam sheet is preferably done at speeds of 0.5 to 10 cm/sec In still another embodiment of the invention, the extraction of continuous foam sheet is preferably done at speeds of 1 to 5 cm/sec In one embodiment the invention is directed to continuously cast solid foam structures having bubble densities in the range of from 50 percent up to 95% by volume.

BRIEF DESCRIPTION OF THE DRAWINGS

These and other features and advantages of the present invention will be better understood by reference to the following detailed description when considered in conjunction with the accompanying drawings wherein:

FIG. 2b is a close-up of the formation of the sheet of molten metal foam shown in FIG. 2a.

DETAILED DESCRIPTION OF THE INVENTION

Figure 1:
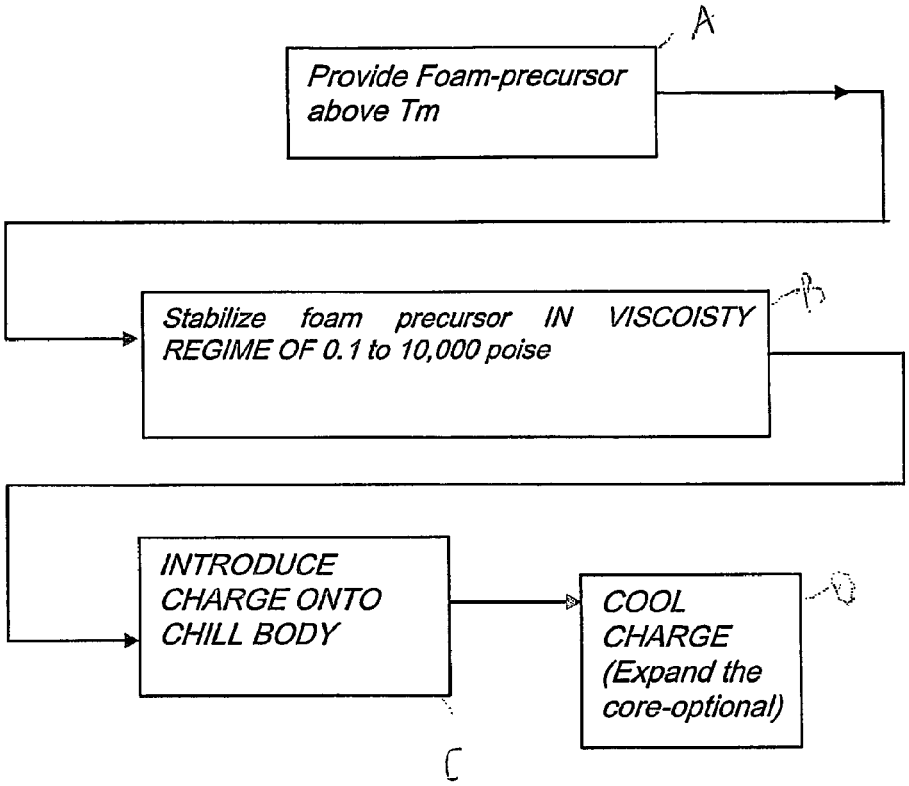
FIG. 1 is block flow diagram of an exemplary method for continuous casting bulk solidifying amorphous alloy foams in accordance with the current invention.

The present invention is directed to method of continuous casting of amorphous metallic foams in sheet or other blanks forms using bulk solidifying amorphous alloys.

For the purposes of this invention, the term amorphous means at least 50% by volume of the alloy is in amorphous atomic structure, and preferably at least 90% by volume of the alloy is in amorphous atomic structure, and most preferably at least 99% by volume of the alloy is in amorphous atomic structure.

Bulk solidifying amorphous alloys are amorphous alloys (metallic glasses), which can be cooled at substantially lower cooling rates, of about 500 K/sec or less, than conventional amorphous alloys and substantially retain their amorphous atomic structure. As such, they can be produced in thickness of 1.0 mm or more, substantially thicker than conventional amorphous alloys, which have thicknesses of about 0.020 mm, and which require cooling rates of $10^5$ K/sec or more. U.S. Pat. Nos. 5,288,344; 5,368,659; 5,618,359; and 5,735,975 (the disclosure of each of which is incorporated herein by reference in its entirety) disclose such exemplary bulk solidifying amorphous alloys.

One exemplary family of bulk solidifying amorphous alloys can be described as $(Zr,Ti)_a(Ni,Cu,Fe)_b(Be,Al,Si,B)_c$, where a is in the range of from 30 to 75, b is in the range of from 5 to 60, and c in the range of from 0 to 50 in atomic percentages. Furthermore, those alloys can accommodate substantial amounts of other transition metals (up to 20% atomic), including metals such as Nb, Cr, V, Co. Accordingly, a preferable alloy family is $(Zr,Ti)_a(Ni,Cu)_b(Be)_c$, where a is in the range of from 40 to 75, b is in the range of from 5 to 50, and c in the range of from 5 to 50 in atomic percentages. Still, a more preferable composition is $(Zr,Ti)_a(Ni,Cu)_b(Be)_c$, where a is in the range of from 45 to 65, b is in the range of from 7.5 to 35, and c in the range of from 10 to 37.5 in atomic percentages. Another preferable alloy family is $(Zr)_a(Nb,Ti)_b(Ni,Cu)_c(Al)_d$, where a is in the range of from 45 to 65, b is in the range of from 0 to 10, c is in the range of from 20 to 40 and d in the range of from 7.5 to 15 in atomic percentages.

Another set of bulk-solidifying amorphous alloys are ferrous metal (Fe, Ni, Co) based compositions, where the content of ferrous metals is more than 50% by weight. Examples of such compositions are disclosed in U.S. Pat. No. 6,325,868, (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. # .2001303218 A), all of which are incorporated herein by reference. One exemplary composition of such alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not as processable as Zr-base alloy systems, they can be still be processed in thicknesses around 1.0 mm or more, sufficient enough to be utilized in the current invention.

In general, crystalline precipitates in amorphous alloys are highly detrimental to their properties, especially to the toughness and strength of such materials, and as such it is generally preferred to limit these precipitates to as small a minimum volume fraction possible so that the alloy is substantially amorphous. However, there are cases where ductile crystalline phases precipitate in-situ during the processing of bulk amorphous alloys, which are indeed beneficial to the properties of bulk amorphous alloys especially to the toughness and ductility. The volume fraction of such beneficial (or non-detrimental) crystalline precipitates in the amorphous alloys can be substantial. Such bulk amorphous alloys comprising such beneficial precipitates are also included in the current invention. One exemplary case is disclosed in (C. C. Hays et. al, Physical Review Letters, Vol. 84, p 2901, 2000), the disclosure of which is incorporated herein by reference.

One exemplary method, according to the present invention, for making foams from these bulk-solidifying amorphous alloy is shown in FIG. 1, and comprises the following steps:

1) Providing a foam pre-cursor above the liquidus temperature of the bulk-solidifying amorphous alloy;
2) Stabilizing the foam precursor in a viscosity regime of 0.1 to 10,000 poise;
3) Ejecting the foam precursor onto the chill body of a continuous casting apparatus
4) Quenching the precursor into an amorphous foam structure.

In the first step, a foam "pre-cursor" at temperatures above the liquidus temperature of the alloy is created. The volume fraction of bubbles in this precursor can be in the range of from 5% to 50%, and the bubbles are preferably created to have a large internal pressure by processing the pre-cursor at high pressures (up to ~50 bar or more).

Secondly, the precursor is stabilized at temperatures around or below the alloy's melting temperature at viscosity regimes of 0.1 poise to 10,000 poise. This step is necessary to stabilize the bubble distribution as well as for the continuous casting of sheet or other blank shapes. Preferably, such stabilization is again carried out under high pressures, up to 50 bar or more, to retain the bubble distribution and high internal pressure in the formed bubbles.

Figure 2A:
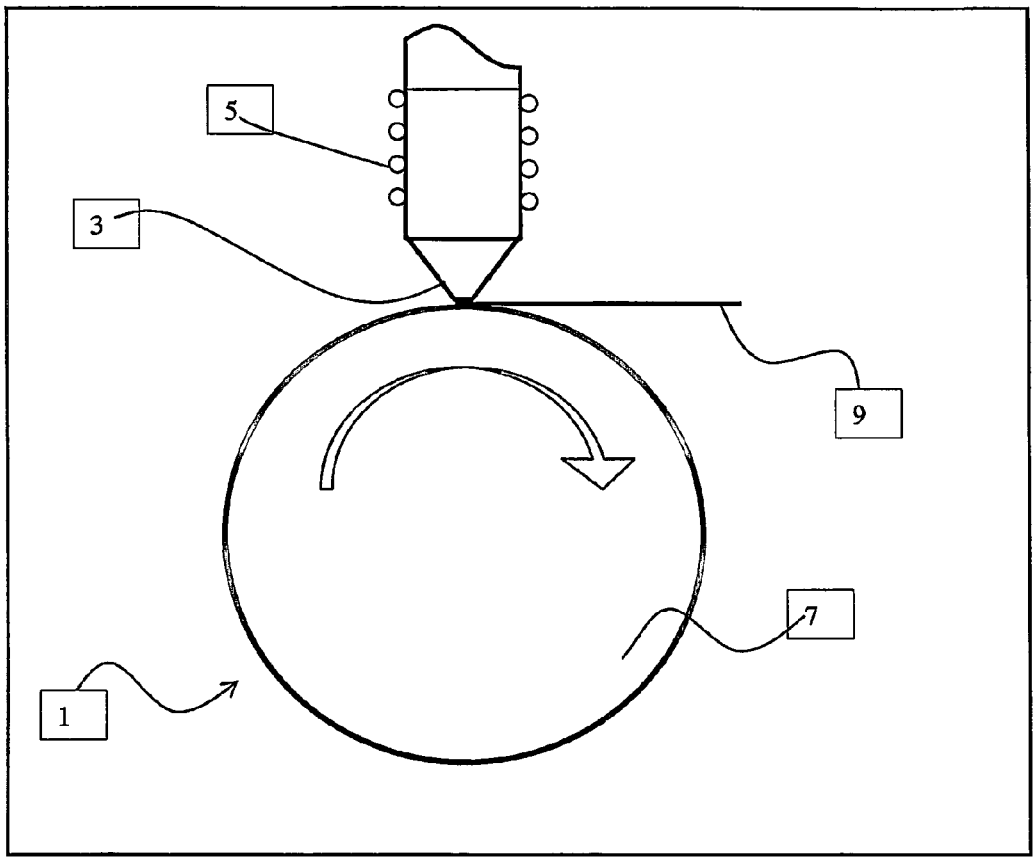
FIG. 2a is a side view in partial cross section of an exemplary conventional apparatus for forming sheets of a molten metal foams.
Figure 2B:
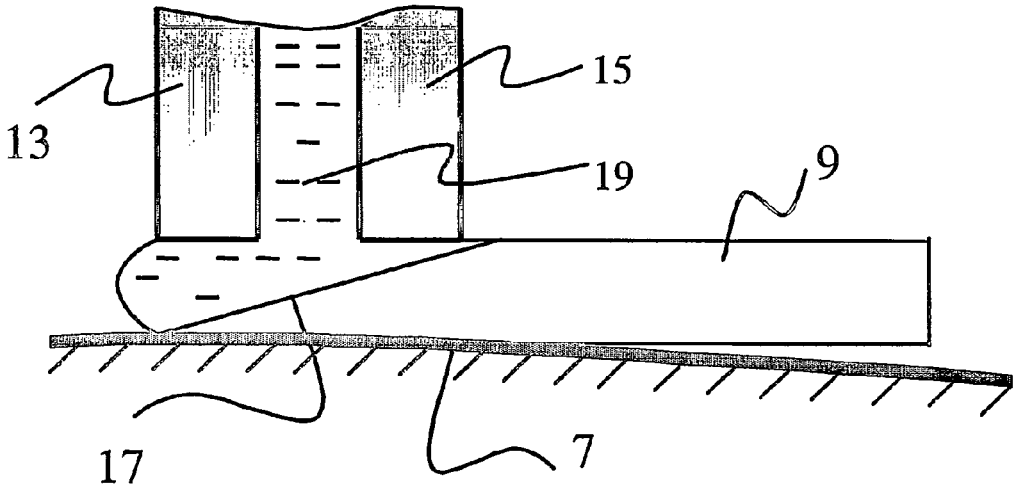

Subsequently, the viscous foam precursor is introduced onto the chill body of a continuous casting apparatus. Schematic diagrams of an exemplary continuous casting apparatus are provided in FIGS. 2a and 2b. As shown in these diagrams, the continuous casting apparatus 1 has a chill body 3 which moves relative to a injection orifice 5, through which the melt 7 is introduced to form a solidified sheet 9. In this specification, the apparatus is described with reference to the section of a casting wheel 3 which is located at the wheel's periphery and serves as a quench substrate as used in the prior art. It will be appreciated that the principles of the invention are also applicable, as well, to other conventional quench substrate configurations such as a belt, double-roll wheels, wheels having shape and structure different from those of a wheel, or to casting wheel configurations in which the section that serves as a quench substrate is located on the face of the wheel or another portion of the wheel other than the wheel's periphery. In addition, it should be understood that the invention is also directed to apparatuses that quench the molten alloy by other mechanisms, such as by providing a flow of coolant fluid through axial conduits lying near the quench substrate. To provide a steady state flow of melt through the orifice, there are some complex relations that need to be satisfied between the applied pressure (or gravitational pull-down), the orifice slit size, the surface tension of the melt, the viscosity of the melt, and the pull-out speed of the solidification front.

As shown, in the detailed view in FIG. 1b, the chill body wheel 7 travels in a clockwise direction in close proximity to a slotted nozzle 3 defined by a left side lip 13 and a right side lip 15. As the metal flows onto the chill body 7 it solidifies forming a solidification front 17. Above the solidification front 17 a body of molten metal 19 is maintained. The left side lip 13 supports the molten metal essentially by a pumping action which results from the constant removal of the solidified sheet 9. The rate of flow of the molten metal is primarily controlled by the viscous flow between the right side lip 15 and solidified sheet 9.

Once the melt is introduced onto the chill body of the continuous casting apparatus, the viscous melt containing the high pressure bubbles is quenched into a solid foam material. During the quenching process, a relatively solid skin can form on the surface of the material having contact with the chill body, whereas the body of the viscous portion of the melt can continue to expand to increase the volume fraction until it completely freezes. The formed solid foam material can then be extracted form the chill body at speeds ranging from 0.1 cm/sec to 50 cm/sec.

As discussed above, in order to prepare the pre-cursor, a gas has to be introduced into the liquid bulk-solidifying amorphous alloy. Any suitable method of introducing bubbles in the liquid bulk-solidifying amorphous alloy sample may be utilized in the current invention. In one exemplary embodiment, gas releasing agents, such as $B_2O_3$ can be used which are mixed with the metal alloy. During the processing, the $B_2O_3$ releases $H_2O_3$ at elevate temperatures, which in turn forms gas bubbles in the size range of between ~20 μm up to ~2 mm. With bubbles within this size range no observable gradient takes place in a typical bulk solidifying amorphous alloy alloy.

Another method to introduce bubbles into a liquid bulk-solidifying amorphous alloy to obtain a pre-cursor foam is by mechanical treating. In such an embodiment, the stability of a liquid surface can be described by comparing the inertial force to the capillary force, according to the ratio:

$$W = \frac{\rho v^2 L}{\sigma} \tag{1}$$

where W is the Weber number, ρ is the density of the liquid, v the velocity of the moving interface, L a typical length for bubble size, and σ the liquid's surface energy. For W<1 the liquid surface becomes unstable and gives rise to mechanically create bubbles in the liquid. This equation makes it possible to calculate the size of bubbles that can be created for a given inertial force and surface energy. For example, an object with a velocity of 10 m/s moving in a liquid with a density of 6.7 g/cm$^3$ and a viscosity of 1 Pa·s is able to break-up bubbles with a size down to 1 μm. In one exemplary embodiment that uses a Vitreloy 106 (Zr—Nb—Ni—Cu—Al Alloy) pre-cursor made in accordance with this mechanical method, a bubble size distribution between 0.020 mm and 1 mm can be readily obtained with a volume fraction of around 10%.

Figure 3:
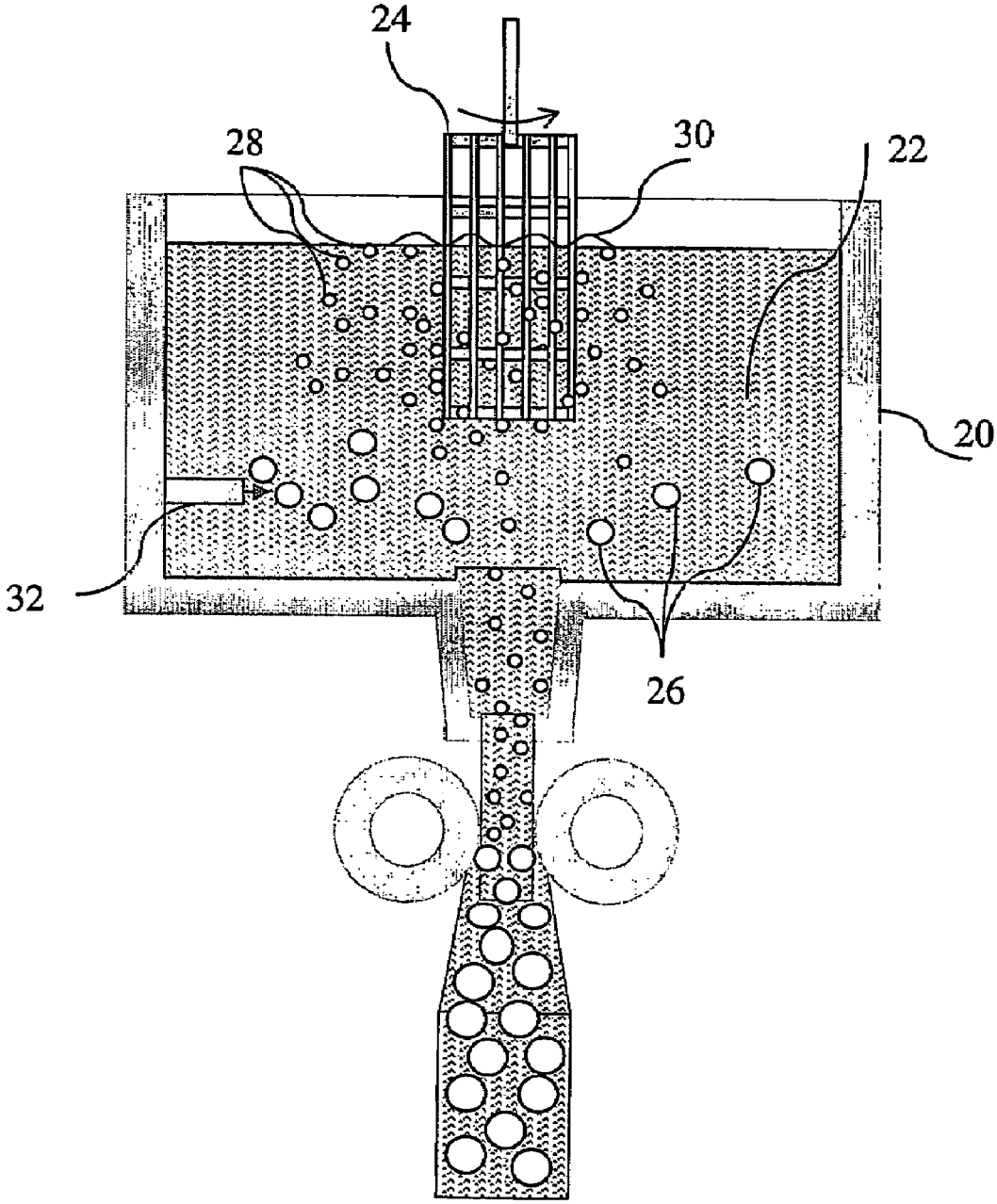
FIG. 3 is a side view in partial cross section of an exemplary apparatus for forming precursors of a molten bulk solidifying amorphous alloy.

A schematic of an apparatus capable of creating a precursor according to this method is shown in FIG. 3. In this embodiment, a heated crucible 20 holds the liquid alloy sample 22 and a spinning whisk 24 is used to breakup existing bubbles 26 and create new bubbles 28 by breaking up the surface 30 of the liquid. A bubbler 32, consisting in this embodiment of a tube through which gas may be passed is used to create the initial bubbles. Initial bubbles can also be created through the surface by a drag of the liquid created by the spinning whisk.

It should be noted that there is a minimum bubble size that can be created using these precursor-forming methods. From energy considerations it can be derived that the minimum bubble size, is given by:

$$Rmin=2\ Sigma/P \tag{2}$$

where sigma is the (surface tension) (as in the above Weber equation), and P is the ambient pressure during bubble creation. It should be noted the bubble size in the foam precursor are preferably as small as possible in order to obtain a better controlled expansion in the subsequent steps. According to the above formula, a high ambient pressure (up to 50 bars or more) is desired during bubble formation in order to create bubbles in smaller diameters.

Figure 4:
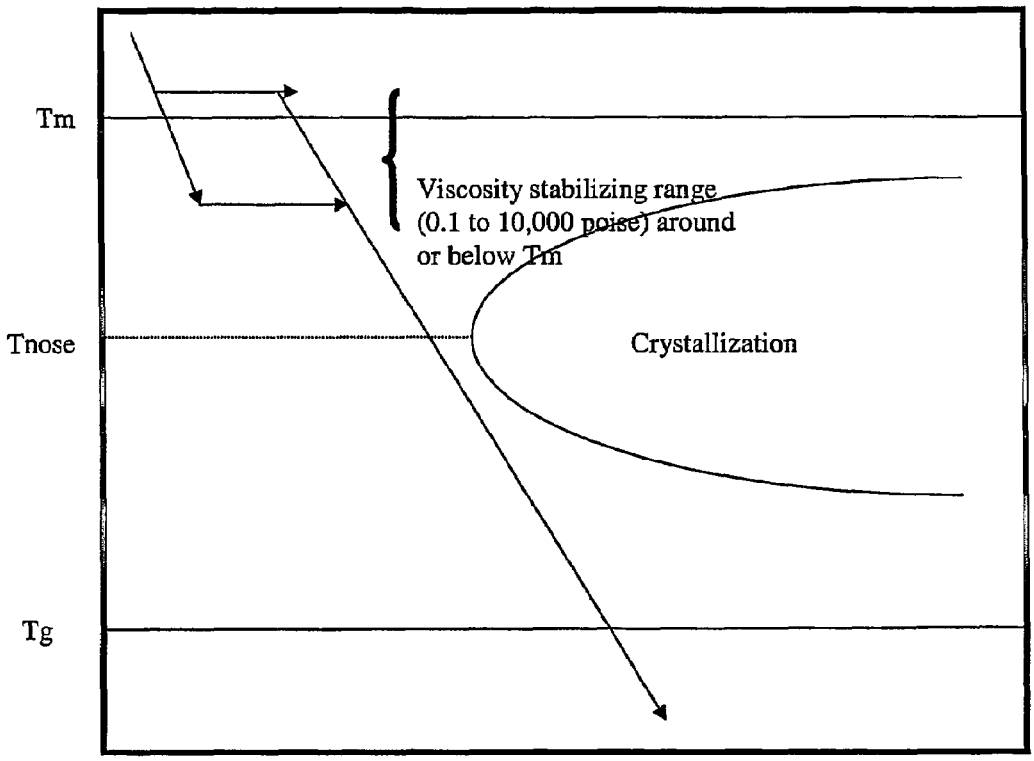
FIG. 4 is a time-temperature transformation diagram for an exemplary continuous foam casting sequence in accordance with the current invention.

As discussed, after the formation of the foam precursor, the melt temperature is stabilized in a viscosity regime of 0.1 poise to 10,000 poise. Since the viscosity increases with decreasing temperature, ejecting the molten amorphous alloy is preferably carried out below Tm for processes using increased viscosity. However, it should be noted that viscosity stabilization should be done at temperatures above Tnose as shown in the TTT diagram provided in FIG. 4.

Figure 5:
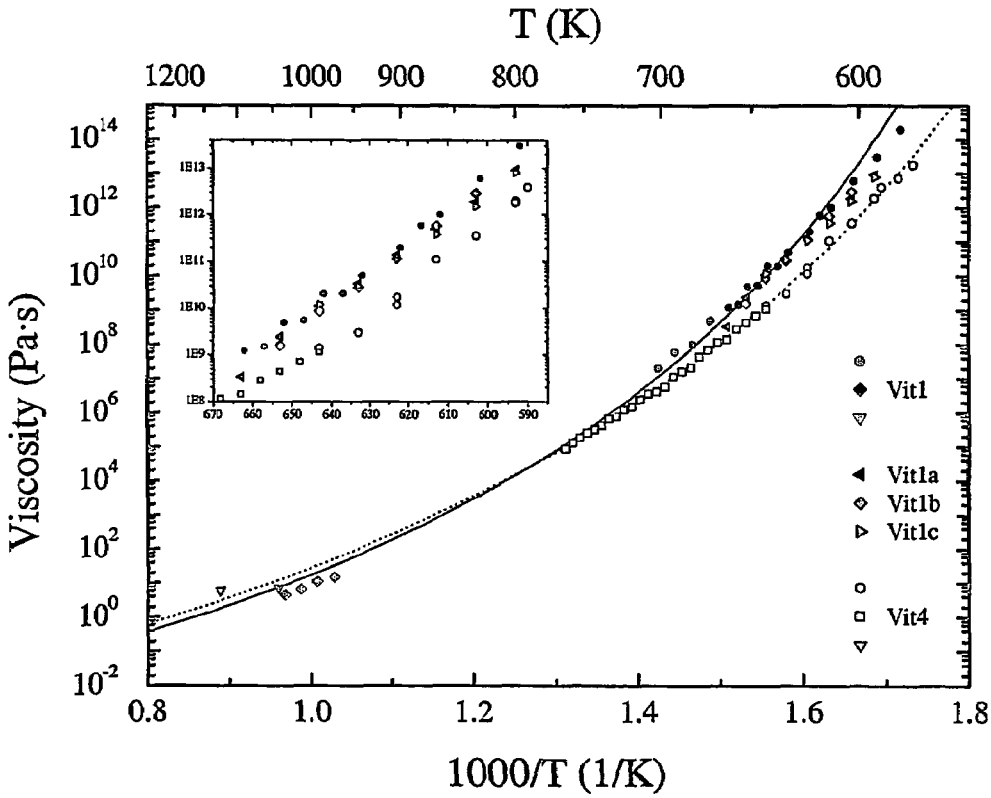
FIG. 5 is a temperature-viscosity of an exemplary bulk solidifying amorphous alloy in accordance with the current invention.

Even though there is no liquid/solid crystallization transformation for a bulk solidifying amorphous metal, a "melting temperature" Tm (or liquidus temperature) may be defined as the temperature of the thermodynamic melting temperature of the corresponding crystalline phases (or the liquidus temperature of the corresponding crystalline phases). Around the melting temperature, the viscosity of the bulk solidifying amorphous metal generally lays in the range 0.1 poise to 10,000 poise, which is to be contrasted with the behavior of other types of amorphous metals that have viscosities around Tm of under 0.01 poise. In addition, higher values of viscosity can be obtained using bulk solidifying amorphous alloys by undercooling the material below the melting temperature Tm, where ordinary amorphous alloys will tend to crystallize rather rapidly. FIG. 5 shows a viscosity-temperature graph of an exemplary bulk solidifying amorphous alloy, from the VIT-001 series of Zr—Ti—Ni—Cu—Be family.

The specific viscosity value at which the melt is stabilized depends on a variety of factors. One important factor is the volume fraction and the respective bubble distribution in the precursor foam melt. A higher viscosity is employed for a higher volume fraction of bubbles in the precursor. Secondly, the selected viscosity value is also dependent on the dimensions of the nozzle through which the foam precursor melt is introduced onto the chill body. Third, the allowable viscosity also depends on the speed the solidified solid foam material is extracted, i.e. the relative speed of the chill body to the nozzle. For a larger thickness of the initial melt precursor, a higher viscosity is desired in order to sustain a stable melt puddle over the chill body. Specifically, the rate of flow of the molten metal is primarily controlled by the viscous flow between the lips of the nozzle and solid strip being formed on the chill body. For the case of a bulk solidifying amorphous metal, it is possible to reliably continue to process a continuous casting of a foam material even at very low wheel rotation speeds. However, in lower viscosity melts low speed rotation of the chill body wheel will cause the material to run and spill over the wheel. For example, low viscosity amorphous materials must be run over high speed chill bodies leading to a thickness restriction for the cast sheet of a few 0.02 mm, in contrast bulk solidifying amorphous alloys may be formed in thicknesses up to 10 mm. Accordingly, for larger thickness foam-strip castings, a higher viscosity is preferred and accordingly, as higher undercooling below Tm is employed.

It should be noted that the bubble distribution and volume fraction can be adjusted during the solidification of foam precursor into a solid foam material. This is due to the fact that that there is no clear liquid/solid transformation for a bulk solidifying amorphous metal during the formation of the amorphous solid. For bulk solidifying amorphous alloys, the molten alloy simply becomes more and more viscous with increasing undercooling as it approaches the solid state around the glass transition temperature. Accordingly, the temperature of the solidification front can be around glass transition temperature, where the alloy will practically act as a solid for the purposes of pulling out the quenched amorphous strip product. This unique property of bulk solidifying amorphous alloys can be utilized to grow the bubble sizes in a controllable manner. In other words, the foam precursor can be expanded to form higher bubble volume fraction during its solidification into a solid foam material. This has also the allows for the formation of solid foam materials with a higher volume fraction of bubble distribution than is possible using conventional metals that require processing above the liquidus temperature.

At the first introduction of the foam melt precursor onto the chill body, a solid skin will form due to the rapid cooling of the surface of the material. The skin thickness will be typically in the range of a few micrometers to tens of micrometers depending on the initial thickness of melt injection and the bubble volume fraction. This can be beneficially utilized to form foam panels with solid outer skins. For example, by utilizing a double-roll or similar apparatus, a foam panel with solid skins can be formed continuously. During such a process the inner core of the melt body will still be in a viscous liquid regime. By employing a higher pressure during the formation of precursor the internal pressure in the bubbles can be made higher than the ambient pressure of the quenching environment. Accordingly, the core of the viscous melt will expand outwards making a foam panel (or foam sandwich) having a thickness larger than the initial melt thickness introduced onto the chill-body. Here, a lower viscosity in the earlier viscosity stabilization step is preferable for a larger expansion of the core. Since the solidification is progressive, rather than abrupt in the case of bulk-solidifying amorphous alloys, choosing a lower viscosity will provide a larger window for expansion of the core, allowing for the formation of a solid foam material with a higher volume fraction of bubbles.

As discussed above, after the charge of the amorphous alloy is injected onto the surface of chill body, the material is cooled to temperatures below glass transition temperature at a rate such that the amorphous alloy retains the amorphous state upon cooling. Preferably the cooling rate is less than 1000° C. per second, *for example, the cooling rate can be less than 10° C. per second,* but sufficiently high to retain the amorphous state in the bulk solidifying amorphous alloy to remain amorphous upon cooling. The lowest cooling rate that will achieve the desired amorphous structure in the article is chosen and achieved using the design of the chill body and the cooling channels. It should be understood that although a cooling rate range is discussed above, the actual value of the cooling rate cannot here be specified as a fixed numerical value because the value varies for different metal compositions, materials, and the shape and thickness of the strip being formed. However, the value can be determined for each case using conventional heat flow calculations.

Although the general process discussed above is useful for a wide variety of bulk-solidifying amorphous alloys, it should be understood that the precise processing conditions required for any particular bulk-solidifying amorphous alloy will differ. For example, as discussed above, a foam consisting of a liquid metal and gas bubbles is an unstable structure, flotation of the lighter gas bubbles due to gravitational force takes place, leading to a gradient of the bubbles in size and volume. The flotation velocity of a gas bubble in any liquid metal material can be calculated according to the Stoke's law:

$$V_{sed}=2\,a^2(\rho_l-\rho_g)g/9\eta \qquad (3)$$

where g is the gravitational acceleration, a is the bubble radius, and $\rho_l$, $\rho_g$, are the densities of the liquid and gas, respectively.

Figure 6A:
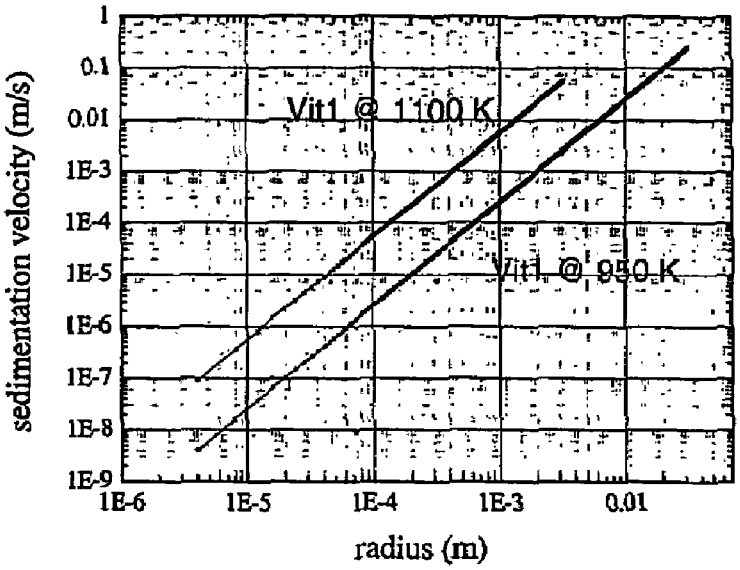
FIG. 6a is a graphical representation of the flotation (sedimentation) properties of an embodiment ($Zr_{41}Ti_{14}Cu_{12}Ni_{10}Be_{23}$ (% atom.) called VIT-1) of a suitable materials for manufacturing amorphous metallic foams according to the current invention
Figure 6B:
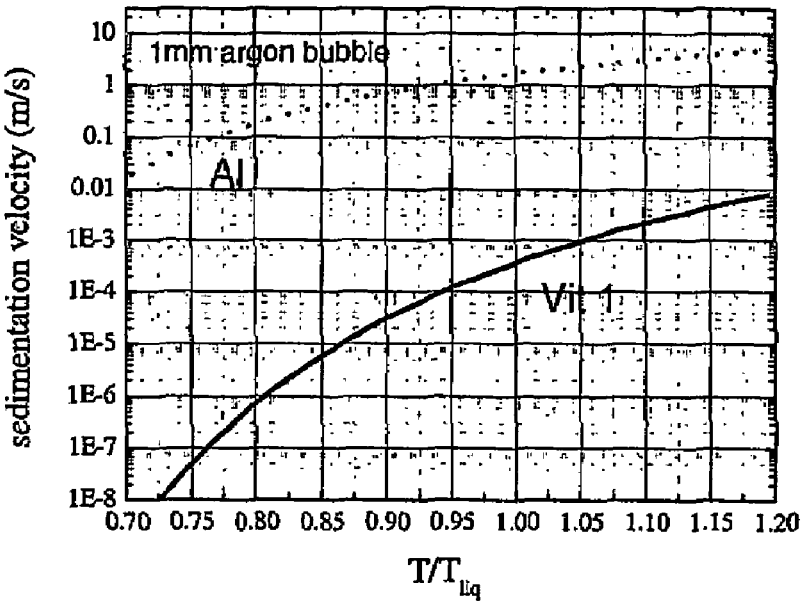
FIG. 6b is a graphical representation of the flotation (sedimentation) properties of an embodiment ($Zr_{41}Ti_{14}Cu_{12}Ni_{10}Be_{23}$ (% atom.) called VIT-1) of a suitable materials for manufacturing amorphous metallic foams according to the current invention as compared to pure Al metal.

An exemplary flotation velocity calculation made according to Equation 1 for VIT-1 is shown in FIGS. 6a and 6b. As shown in FIG. 6a, using experimental viscosity data (as shown in FIG. 5) and a liquid VIT-1 density of $\rho=6.0\times10^3$ kg/m$^3$, the flotation velocities of bubbles in a VIT-1 alloy melt as a function of bubble radius is calculated for liquid VIT-1 at 950 K ( — ), and 1100 K ( - - - ). FIG. 6b shows the flotation for a 1 mm gas bubble in liquid VIT-1 ( — ) and liquid Al ( - - - ) as a function of $T/T_1$.

Using such graphs, acceptable processing conditions, such as time and temperature can be determined. For example, if the duration of a typical manufacturing process is taken to be 60 s and an acceptable flotation distance of ~5 mm, processing times and temperatures resulting in a flotation velocity smaller than $10^{-4}$ m/s would be acceptable. Therefore, in this case an unacceptable bubble gradient can be avoided if the maximum bubble size is less than 630 μm if the VIT-1 melt is processed above its liquidus temperature of about 950 K.

As described, the present invention allows for the continuous casting of solid foam structures with varying bubble densities. In one embodiment of the invention, the continuously cast solid foam structures have a bubble density in the range of from 50 percent up to 95% by volume. The invention further allows the use of lesser bubble density in molten state above Tm, and increases the bubble density (by volume) by expansion during continuous casting.

Although specific embodiments are disclosed herein, it is expected that persons skilled in the art can and will design alternative continuous foam sheet casting apparatuses and methods to produce continuous amorphous alloy foam sheets that are within the scope of the following claims either literally or under the Doctrine of Equivalents.

What is claimed is:

1. A method of manufacturing a continuous sheet of a metallic glass foam from a bulk-solidifying amorphous alloy comprising:

providing a quantity of a bulk solidifying amorphous alloy foam precursor at a casting temperature around the melting temperature of the alloy;

stabilizing the bulk solidifying amorphous alloy at a casting temperature below the melting temperature [$T_m$] of the alloy and above the temperature at which crystallization occurs on the shortest time scale for the alloy

[$T_{NOSE}$] such that the viscosity of the bulk solidifying amorphous alloy is from about 0.1 to 10,000 poise;

introducing the stabilized bulk solidifying amorphous alloy foam precursor onto a moving casting body such that a continuous sheet of heated bulk solidifying amorphous alloy is formed thereon; and quenching the heated bulk solidifying amorphous alloy foam precursor at a quenching rate sufficiently fast such that the bulk solidifying amorphous alloy remains in a substantially amorphous phase to form a solid amorphous continuous foam sheet having a thickness of at least 0.1 mm.

2. The method according to claim 1, wherein the precursor is formed by providing a molten bulk-solidifying amorphous alloy; and introducing a plurality of gas bubbles to the molten alloy at a temperature above the liquidus temperature of the molten alloy to form a pre-cursor.

3. The method of claim 1, wherein the viscosity of the bulk solidifying amorphous alloy at the "melting temperature" Tm of the bulk solidifying amorphous alloy is from about 10 to 100 poise.

4. The method of claim 1, wherein the viscosity of the bulk solidifying amorphous alloy at the "melting temperature" Tm of the bulk solidifying amorphous alloy is from about 1 to 1000 poise.

5. The method of claim 1, wherein the critical cooling rate of the bulk solidifying amorphous alloy is less than 1,000° C./sec.

6. The method of claim 1, wherein the critical cooling rate of the bulk solidifying amorphous alloy is less than 10° C./sec.

7. The method according to claim 2, wherein the gas bubbles are introduced to the molten alloy by stirring the molten alloy.

8. The method according to claim 2, wherein the gas bubbles are introduced to the molten alloy by adding an gas releasing agent to the molten alloy.

9. The method according to claim 1, wherein a volume fraction of <30% of a plurality of bubbles having sizes between 1 μm and 1 mm are introduced to the molten alloy.

10. The method according to claim 1, wherein at least 50% by volume of the metallic glass foam has an amorphous atomic structure.

11. The method according to claim 1, further including homogenizing the expanded bubbles by mechanically stirring the pre-cursor.

12. The method according to claim 1, wherein the step of introducing gas bubbles to form the pre-cursor occurs at a pressure up to 50 bar or more.

13. The method according to claim 1, wherein the bubbles of the metallic foam have a size distribution of about 10 μm.

14. The method according to claim 1, wherein the bulk solidifying amorphous alloy is a Zr-base amorphous alloy.

15. The method of claim 1, wherein the quenching occurs on the casting body.

16. The method of claim 1, wherein the casting body is selected from the group consisting of a wheel, a belt, double-roll wheels.

17. The method of claim 1, wherein the casting body is formed from a material having a high thermal conductivity.

18. The method of claim 1, wherein the casting body is formed of a material selected from the group consisting of copper, chromium copper, beryllium copper, dispersion hardening alloys, and oxygen-free copper.

19. The method of claim 1, wherein the casting body is at least one of either highly polished or chrome-plated.

20. The method of claim 1, wherein the casting body moves at a rate of 0.5 to 10 cm/sec.

21. The method of claim 1, the casting temperature of the alloy is stabilized in a viscosity regime of 1 to 1,000 poise.

22. The method of claim 1, wherein the casting temperature of the alloy is stabilized in a viscosity regime of 10 to 100 poise.

23. The method of claim 1, wherein the foam sheet has a thickness of 0.5 to 3 mm.

*24. A method of manufacturing a continuous sheet of a metallic glass foam from a bulk-solidifying amorphous alloy comprising: providing a quantity of a bulk solidifying amorphous alloy foam precursor at a casting temperature around the melting temperature of the alloy; stabilizing the bulk solidifying amorphous alloy at a casting temperature below the melting temperature ($T_m$) of the alloy and above the temperature at which crystallization occurs on the shortest time scale for the alloy ($T_{NOSE}$); forming the stabilized bulk solidifying amorphous alloy foam precursor into a continuous sheet of heated bulk solidifying amorphous alloy; and quenching the heated bulk solidifying amorphous alloy foam precursor at a quenching rate sufficiently fast such that the bulk solidifying amorphous alloy remains in a substantially amorphous phase to form a solid amorphous continuous foam sheet having a thickness of at least 0.1 mm.*

*25. The method of claim 24, wherein the viscosity of the bulk-solidifying amorphous alloy at the casting temperature is from about 0.1 to 10,000 poise.*

* * * * *